United States Patent [19]

Remy et al.

[11] 4,361,853
[45] Nov. 30, 1982

[54] SYSTEM FOR REDUCING THE VISIBILITY OF THE NOISE IN TELEVISION PICTURES

[75] Inventors: Maurice A. Remy, Paris, France; Jacques Poncin, 10, Boulevard Volney; Pierre R. Rogel, 14, rue Frederic Sacher, both of 35000 Rennes, France

[73] Assignees: Telediffusion de France; Jacques Poncin; Pierre R. Rogel, all of France

[21] Appl. No.: 108,494

[22] Filed: Dec. 31, 1979

Related U.S. Application Data

[63] Continuation of Ser. No. 895,912, Apr. 13, 1978, abandoned.

[30] Foreign Application Priority Data

Apr. 14, 1977 [FR] France .............................. 77 11800

[51] Int. Cl.³ ............................................. H04N 5/21
[52] U.S. Cl. ................................................. 358/167
[58] Field of Search ...................... 358/167, 36, 37, 38, 358/162, 105, 166

[56] References Cited

U.S. PATENT DOCUMENTS

| | | | |
|---|---|---|---|
| 3,009,016 | 11/1961 | Graham | 358/167 |
| 3,716,667 | 2/1973 | Connor et al. | 358/136 |
| 3,716,670 | 2/1973 | Lowry | 358/162 |
| 4,064,530 | 12/1977 | Kaiser et al. | 358/167 |
| 4,090,221 | 5/1978 | Connor | 358/167 |

FOREIGN PATENT DOCUMENTS 2236334 2/1974 Fed. Rep. of Germany .

OTHER PUBLICATIONS

Pease et al., "Exchange of Spatial and Temporal Resolution in Television Coding", *The Bell System Technical Journal,* Jan. 1971, pp. 191-199.

*Primary Examiner*—John C. Martin
*Attorney, Agent, or Firm*—Laff, Whitesel, Conte & Saret

[57] ABSTRACT

A television signal noise reduction system employs a movement detector for automatically selecting one of three parallel processing paths, the first of which passes the video signal without modification and the other two of which calculate different weighted averages of the current pixel and surrounding pixels from the current frame and the previous frame.

5 Claims, 5 Drawing Figures

SYSTEM FOR REDUCING THE VISIBILITY OF THE NOISE IN TELEVISION PICTURES

This is a continuation of application Ser. No. 895,912, filed Apr. 13, 1978, now abandoned.

The present invention relates to systems for reducing the visibility of the noise in television pictures using digital techniques.

Studies already exist on the reduction of noise in television pictures using analog techniques, for example, those described in French Pat. No. 2169830. However, these analog methods for the treatment of television signals do not allow advantage to be taken of the spatial and temporal relationships in a television picture in such a flexible manner as do digital techniques.

Digital techniques were originally applied to complete television pictures for technical reasons concerned with transmission and were intended to reduce the number of transmitting channels involving the possibility of frame rate reduction. A technical article entitled "Combining intraframe and frame-to-frame coding for television" by J. O. Limb and others which appeared in the American technical review, the Bell System Technical Journal of July-August 1974, can be referred to in this regard. However, these previously proposed digital techniques were not intended for the reduction of the visibility of noise in the picture.

This problem of the reduction of the visibility of noise arises particularly when the noise originates from a source itself, for instance when using old film in bad condition taken from archives, or where television recordings have been made in bad lighting conditions etc. This problem can also arise in cases in which the television signals are received under adverse conditions.

The invention is intended to minimize this problem of the visibility of the noise by applying digital techniques to a television signal.

More especially, the invention is intended for use in a system incorporating an analog-digital converter, whose output is linked, on the one hand, to the input of a digital coder circuit, and, on the other hand, to the input of a movement detector circuit, whose output is linked to the command input of the digital coder circuit. The digital circuit output is linked to a digital analog converter input emitting the television signal. The digital coder circuit incorporates a series of digital filter circuits of the applied digital signal. The selection of the filter circuit, whose output is linked to that of the digital coder circuit, is controlled by the output signal from the movement detector.

Another feature is the filter circuit incorporating a calculation circuit, whose first input is linked to the coder circuit input and whose second input is linked to the output of a delay line. The delay is equal to the duration of a complete picture. The output is connected on the one hand to the filter circuit output and on the other hand to the input of the delay line. The calculation circuit determines the weighted sum of the values applied to the two inputs.

According to another feature, the weighting coefficients of the values applied to the two calculation circuit inputs are equivalent to $\frac{1}{2}$.

Another feature is that the weighting coefficients of the values applied respectively to the first input and the second input of the calculation circuit are equivalent to $\frac{1}{4}$ and $\frac{3}{4}$ respectively.

Another feature is that the weighting coefficients of the values applied respectively to the first input and the second input of the calculation circuit are equivalent to 1 and 0 respectively.

Another feature is that the filter circuit outputs are connected by a selector controlled by the movement detector circuit and connect only one of the outputs at any one time to the digital coder output.

Another feature is that, instead of one delay line for each filter circuit, one single delay line is provided whose input is connected to the digital coder circuit output and whose output is amplified at the second inputs of the calculation circuits of the filter circuits.

Another feature is that the movement detector circuit incorporates an evaluation circuit whose first input is connected to the input of the detector circuit, and whose second input is connected to the output of a frame memory, whose input is linked to the input of the detector circuit. The evaluation circuit incorporates a calculation facility in order to obtain a series of digital variations, represented by absolute values, between the respective digital values of an initial series of points comprising the point being currently processed and the points adjacent to the currently processed point in the same frame, and the respective values of the second state of points corresponding to the points in the first series in the preceding picture. There is a means of comparison of the individual digital variations with an initial digital threshold value. There is also an evaluation of the variations which are greater than the first digital threshold value. A decision circuit compares the result issued by the calculation facility with the second set of threshold values and issues, depending on the result of the comparison, a command signal for selection of the filter circuit outputs.

According to a further feature, the movement detector circuit incorporates an evaluation circuit whose first input is connected to the detector circuit input, and whose second input is connected to the output of a frame memory whose input is connected to the detector circuit input. The evaluation circuit has a calculating arrangement to provide a series of digital variations between the respective digital values of a first series of points comprising the point being currently processed and the neighboring adjacent points on the same line, and the respective digital values of a second series of points corresponding to the points in the first series in the previous frame, thereby obtaining the weighted value of said variations. The system makes a comparison of the absolute value of the sum issued by the calculation facility with the threshold value. This calculation facility issues a command signal for the selection of the filter circuit output.

The above mentioned features of the invention, in addition to other features, will be demonstrated more clearly with reference to the following description of embodiments which is given by way of example with reference to the accompanying drawings, in which.

Figure 1:
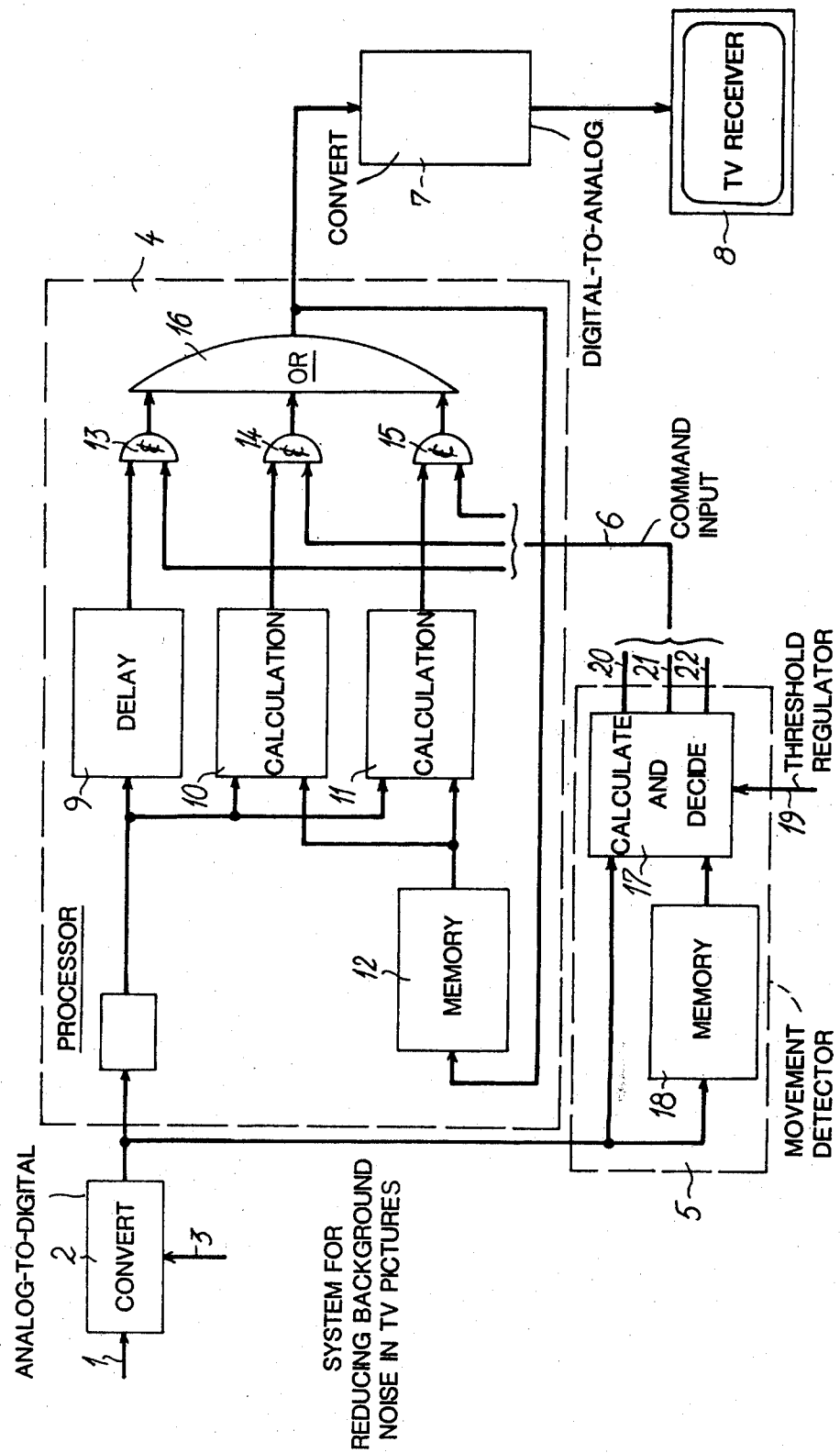
FIG. 1 is a block diagram showing a system for the reduction of visible noise in accordance with the invention.

In FIG. 1 the system for reduction of visible noise disturbance in a television picture incorporates an input 1 for analog video signals originating, for example, from a television camera and suppying an analog digital converter 3, which receives from a source 3 sample timing signals. The converter 2 supplies on the one hand a processor circuit 4 and on the other hand a movement detector 5, whose output is connected to the command input 6 of the processor circuit 4. The output of the processor circuit 4 is connected to the input of a digital-analog converter 7, which supplies a processed signal user circuit for example a television picture receiver 8.

The processor circuit 4 incorporates, in the example described, three processor channels of which the first contains a delay circuit 9, the second a calculation circuit 10 and the third a calculation circuit 11. The second and third channels also include a common memory 12. The input of circuit 9 is connected to the output of converter 2 while its output is connected to the first input of an AND gate 13. The first input of circuit 10 is connected to the output of converter 2, while its output is connected to the first input of AND gate 14. The first input of circuit 11 is connected to the output of converter 2 while its output is connected to the first input of AND gate 15. The outputs of gates 13 to 15 are connected respectively to the three inputs of an OR gate 16, whose output is connected on the one hand to the input of the convertor 7, and on the other hand to the input of the memory 12, whose output is connected, in parallel, to the second inputs of circuits 10 and 11.

The detector 5 incorporates a calculation and a decision circuit 17 whose first input is connected to the output of converter 2, and a memory 18 whose input is also connected to the input of converter 2 and whose output is connected to the second input of circuit 17. The circuit 17 also incorporates a threshold regulator input 19. The outputs of circuit 17, which, in the example described are three in number and bear the reference numbers 20 to 22, are connected respectively, via 6, to the second inputs of gates 13 to 15.

The converter 2 is a standard circuit which samples the analog signal applied by 1, with a sample frequency applied in 3 of 12 MHz, for example, for a video signal band width of 6 MHz, and subsequently encodes the samples in a standard PCM code of eight binary element for instance. Thus all the system connections between 2 and 7, with the exception of the link passing via 6, comprise eight lines for transmission of the eight binary elements of each sample. It must be understood that if the input signal on line 1 is already digitized, the converter 2 may be omitted.

Figure 2:
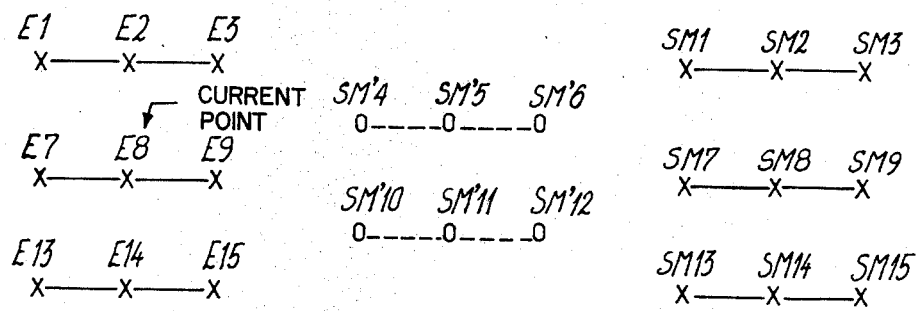
FIG. 2 illustrates the respective positions of a point being currently processed, adjacent points in the same frame, adjacent points in the preceding frame and points corresponding to the point being currently processed and to the adjacent points in the same frame in the preceding picture.

Before describing the structure of the calculator circuits 10 and 11 and of the memory 12, we shall first consider, with reference to FIG. 2, the various types of digital processing possible. We shall assume only that the memory 12 allows access at any time to a certain number of samples corresponding to points spatially and temporarily adjacent to a sampled point. In FIG. 2 we have shown, for the currently considered frame containing the point E8 under consideration, the nine points E1, E2, E3, E7, E8, E9, E13, E14, E15 for the frame preceding the frame under consideration, the six points SM′4, SM′5, SM′6, SM′10, SM′11, SM′12 and for the preceding picture, the points SM1, SM2, SM3, SM7, SM8, SM9, SM13, SM14 and SM15, in addition to the processed point R8 under consideration.

The points E7 and E9 are the points immediately adjacent to the current point E8 on the same line. The points E1 to E3 are those in the same frame on the line immediately above and are immediately above the points E7 to E9. The points E13 to E15 are beneath point E7 to E9 on the line below. The points SM′4 to SM′6 are on the line immediately above in the preceding frame, while the points SM′10 to SM′12 are on the line immediately below. The points SM1, SM2 etc. correspond in the preceding picture to the points E1, E2 etc. respectively.

It should be remembered that, as the values of the points mentioned in FIG. 2 are known, one can, by combining these values, provide for three types of filter; a spatial filter which only affects points E1 to E15 contained in the same picture, a temporal filter which affects the current point E8 and its corresponding point SM8 in the preceding picture, or finally a spatio-temporal filter which affects the series of points in FIG. 2. It should be noted that the spatial filter incorporates two interesting special features, which are the spatial horizontal filter, affecting the points E7, E8 and E9 and the spatial vertical filter affecting the points E2, E8 and E14. A more complex horizontal filter could affect a greater number of points on the same line on either side of the current point E8. It should also be noted that, in a temporal filter, the sampling times must coincide spatially which means that the sampling structure must remain constant from one picture to the next.

Finally the temporal filter may be simple when the value of the point SM8 is that of the preceding picture received directly from the source or reiterated when this value is that which results from processing of the corresponding points of the preceding picture.

Practical experiments have shown that purely spatial filtering does not substantially reduce visible noise disturbance and in addition causes degradation of the useful picture information so much so that in this context spatial filtering has negative or zero value. On the other hand temporal filtering, and in particular reiterated temporal filtering, causes substantial reduction in visible noise disturbance with stationary pictures; however, temporal filtering causes easily perceptible blurring effects in moving pictures.

For this reason, the invention provides for temporal filtering of the stationary points of each picture, but with use of a movement detector it also provides for reduction, and where necessary for complete elimination, of temporal filtering of the points judged by the movement detector to be moving.

Before describing the movement detector 5, used in this invention, an example of picture memory will be described with reference to FIG. 3, which allows the values of the points mentioned in FIG. 2 to be delivered at different output points. This memory is standard and is only described in order to illustrate the invented system. It incorporates a signal input 23 which supplies a first branch comprising two delay lines RL1 and RL2, a second branch comprising two delay lines R1 and R2, and third branch consisting of a memory RT1 and an output E1. The part common to the lines RL1 and RL2 supplies a branch comprising two lines R3 and R4 and the output E9. The output of the line RL2 supplies the branch comprising two delay lines R5 and R6 and the output E3. The part common to the lines R1 and R2 supplies the output E14 and the free output of R2 supplies the output E13. The part common to the lines R3 and R4 supplies the output E8 and the free output of R4 supplies the output E7. The part common to the lines R5 and R6 supplies the output E2 and the free output of R6 supplies the output E1.

The output of the memory RT1 supplies a first branch comprising a delay line RL3, a second branch comprising two delay lines R7 and R8, a third branch comprising a delay line RT2 and the output SM'12. The output of the line RL3 supplies a branch comprising two delay lines R9 and R10 and the output SM'6. The part common to the lines R7 and R8 supplies the output SM'11, and the free output of R8 supplies the output SM'10. The part common to the lines R9 and R10 supplies the output SM'5 and the free output of R10 supplies the output SM'4. The output of the line RT2 supplies the first branch comprising two delay lines RL4 and RL5 and a second branch comprising two delay lines R11 and R12 and the output SM15. The part common to the lines RL4 and RL5 supplies a first branch comprising two delay lines R13 and R14 and the output SM9. The free output of line RL5 supplies a branch comprising two delay lines R15 and R16 and the output SM3. The part common to the lines R11 and R12 supplies the output SM14 and the free output of R12 supplies the output SM13. The part common to lines R13 and R14 supplies the output SM8 and the free output of R14 supplies the output SM7. The part common to lines R15 and R16 supplies the output SM2 and the free output of R16 supplies the output SM1.

Figure 3:
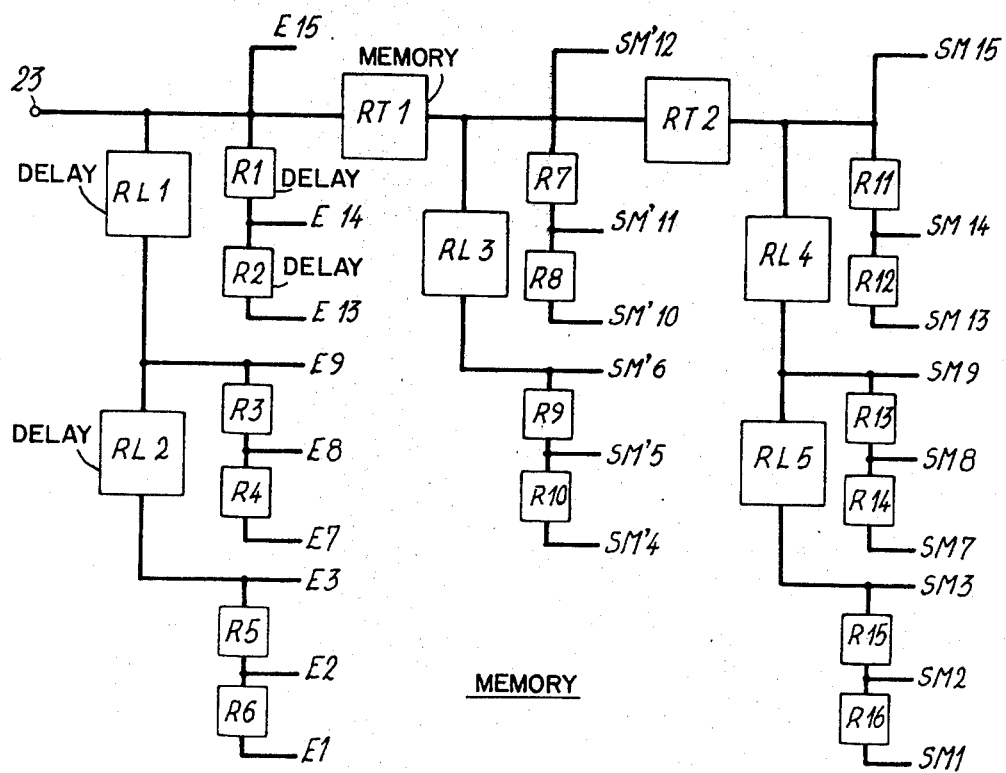
FIG. 3 is a block diagram of a memory used in the system in FIG. 1.

It appears that in FIG. 3 the outputs E1, E2, ... SM15 carry the same references as points E1 to SM15 in FIG. 2 for which they provide the corresponding values. The delay lines RT1 and RT2 cause the signals applied to them to be delayed respectively for one frame, or in a 625 line television system, for 20 ms. The delay lines RL1 to RL5 cause the signals applied to them to be delayed for one line, or in the same system for 64 s. The delay lines R1 to R16 cause the signals applied to them to be delayed respectively for a period dependant on the sampling frequency used for digitization, that is for the number of points per line. In the example described this would involve a delay of 83.3 ns corresponding to a sampling frequency of 12 MHz with 624 points per active line. Delay lines can be manufactured according to MOS technology.

The practical structure of memories constituted by these delay lines may be simplified when the process or processes to be applied to the signals have been selected. Thus, as has been shown above, the processes which seem most efficient for stationary pictures are reiterated temporal filters of which the most simple only affect the current point E8 and the point SM8 or RSM8, if one calls the point deduced from the corresponding point processed in the preceding picture by passage through two consecutive frame memories, such as RT1 and RT2, RSM8.

In the example in FIG. 1, the delay line memory 12 thus comprises two consecutive frame memories which delay the processed signal transmitted to the output of the OR gate 16. The calculation circuit 10 performs the following calculation:

$$b = (E8 + RSM8) \times \tfrac{1}{2}$$

where E8 is the value of the current point originating from 2 and RSM8 is the value issued by memory 12 and b is the value issued by calculator 10.

The calculation circuit 11 performs the following calculation:

$$c = (E8 + 3 \times RSM8) \times \tfrac{1}{4}$$

where c is in this case the value issued by 11.

The delay 9 is intended to compensate for the delay caused by circuits 10 and 11 so that the signal a which it transmits is applied to gate 13 at the same time that b and c are applied respectively to AND gates 14 and 15. It appears therefore, that movement detector circuit 5 allows the choice to be made as to which of the AND gates 13 to 15 is to be opened to allow the OR circuit 16 to transmit the correct processed signal to the converter 7 and to the picture receiver 8 on the one hand, and on the other hand to the input of delay line memory 12 for use in the processing of the following picture.

Figure 4:
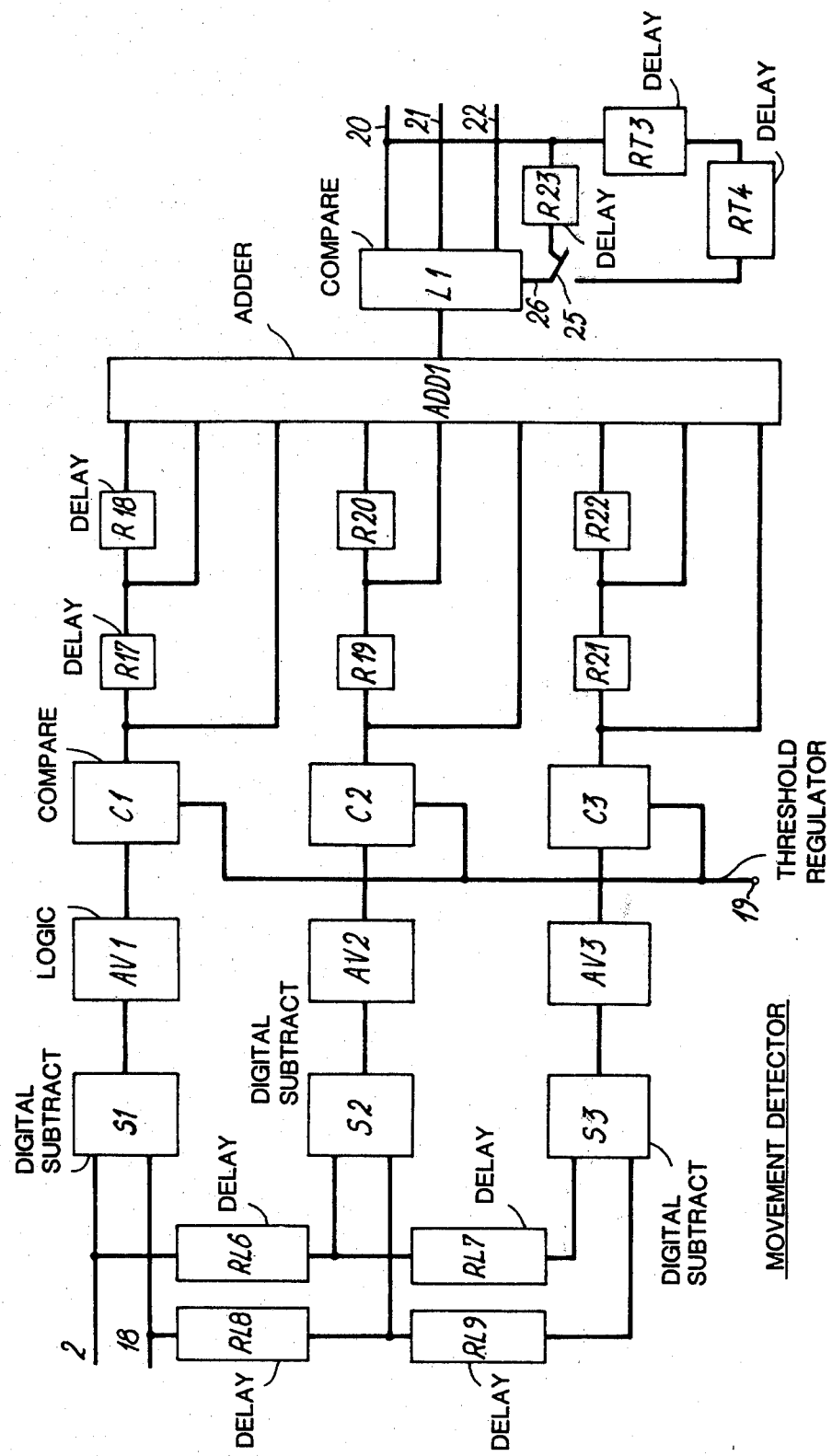
FIG. 4 is the diagram of a first movement detector for use in the system in FIG. 1.

The operation of the movement detector 5 will now be described, firstly in relation to a first example of the detector circuit 17, as shown in FIG. 4.

The circuit in FIG. 4 comprises an input connected to the outut of converter 2, which supplies the branch composed of two lines RL6 and RL7 in series and the first input of a digital subtraction circuit S1. The part common to RL6 and RL7 is connected to the first input of a digital subtraction circuit S2. The free output of RL7 is connected to the first input of a digital subtraction circuit S3. It also incorporates an input connected to the output of memory 18 which supplies a branch comprising two consecutive lines RL8 and RL9 and the second input of S1. The point common to RL8 and RL9 is connected to the second input of S2 and the free output of RL9 to the second input of S3. Lines RL6 to RL9 are similar to delay lines RL1 to RL5 in FIG. 3. The circuits S1 to S3 are standard logic subtraction circuits. It appears that the values applied to their inputs are those of adjacent points on the same vertical line in the current picture and the preceding picture.

The output of subtract circuit S1 is connected to the input of a standard logical circuit AV1 which only retains the absolute value of the algebraic difference issued by S1. The output of the circuit AV1 is connected to the first input of a logical comparison circuit C1 whose second input is connected to the threshold value input 19 and which issues a binary digit 1, if the value applied by AV1 is greater than that of the threshold applied at input 19, and a binary digit 0 in the opposite case. The logic output of the circuit C1 is connected on the one hand to the third input of an adder circuit ADD 1, and on the other hand to the input of a delay line R17. The output of delay line R17 is on the one hand connected to the second input of the circuit ADD1, and on the other hand to the input of a delay line R18, whose output is connected to the first input of the circuit ADD1.

The output of the circuit S2 is connected to the input of the circuit AV2, identical to AV1, followed by a circuit C2, identical to C1, which is itself followed by two delay lines R19 and R20, assembled in the same way as R17 and R18. The output of R20 is connected to the fourth input of ADD1, the output of R19 to the fifth input and the output of C2 to the sixth input. Similarly, the circuit S3 is followed by a circuit AV3, identical to AV1, then by a circuit C3 identical to C1, and by two delay lines R21 and R22. The output of delay line R22 is connected to the 7th input of ADD1, the output of delay line R21 to the 8th input and the output of comparator C3 to the 9th input.

The output of the adder circuit ADD1 is connected at the input of a comparison circuit L1 incorporating two threshold value inputs M and N. The output of the circuit L1 is constituted by the three control lines 20, 21 and 22, of which only one at a time is activated to open one only of the three AND gates 13 to 15. The line 20 is connected on the one hand to the input of a delay line R23, and on the other hand to the input of a delay circuit constituted by two lines RT3 and RT4 in series. A switch contact 25 allows connection of the output of R23 or RT4 as required to the input 26 of the circuit L1.

It should be noted that the lines R17 to R23 have a delay of one point in any one line, for example R1, and that the lines RT3 and RT4 have a delay of one frame like RT1.

As has been seen above, the circuits S1 to S3 process points situated on the same vertical line in the current picture and in the preceding picture in order to obtain three different samples in one vertical line. The lines R17 to R22, assembled in a similar way to the lines R1 to R6, allow simultaneous transmission of information to the respective inputs of the circuit ADD1, where threshold levels are passed during sampling of a current point E8, and of the eight points surrounding it as shown in FIG. 2, for which the relevant information is transmitted by R19. Therefore the circuit ADD1 allows calculation of the number of points out of the nine sampled whose amplitude has varied by a value greater than the threshold level in relation to the corresponding points in the preceding picture. The circuit L1 is a logic circuit which activates one of the lines 20 to 21 as shown in the following table of values:

|       | x        |             |          |
|-------|----------|-------------|----------|
| y     | x < M    | M < x < N   | x > N    |
| y = 0 | 22       | 21          | 20       |
| y = 1 | 21       | 20          | 20       |

In this table x represents the number of points showing flexure measurements whose absolute values are greater than the threshold level 19 and is transmitted by ADD1. The letter y represents a decision taken for a preceding point and M and N represent the decision threshold values chosen arbitrarily.

In practice, the preceding point on which y is based is, in relation to current point E8, either the point immediately preceding it in the same line, that is E7, when the switch 25 connects the output of R23 to the input 26 of logic circuit L1, or a corresponding point of the preceding picture, that is SM8, when the switch 25 connects the output of delay line RT4 to the input 26. The y value has the value 0 when, for the preceding point, E7 or SM8, there have been few variations in the series of the nine points which surround it, which means that the line 22 has been activated, and the value 1 in the other cases, that is when the line 20 has been activated.

When the preceding point considered is E7, one is said to be taking account of the spatial hysteresis. When the point SM 8 is under consideration, one is said to be taking account of temporal hysteresis from one picture to the next.

In practice it is possible to regulate the values of the thresholds on wire the value of 19 of M and of N subjectively in order to obtain the picture or rather the series of pictures which seems best. Experience has shown that the values of M and N can be fixed permanently, but that it was interesting to be able to play with the value of the threshold of 19 which may be at the disposal of an operator.

It is evident that one could not increase the thresholds M, N, etc. in the circuit L1, by providing for more than three parallel filter circuits in the processing circuit 4, in order to process the picture points by more progressive filtering. However, experience has shown that processing by three circuits, such as those described above, allowed a distinct improvement.

Figure 5:
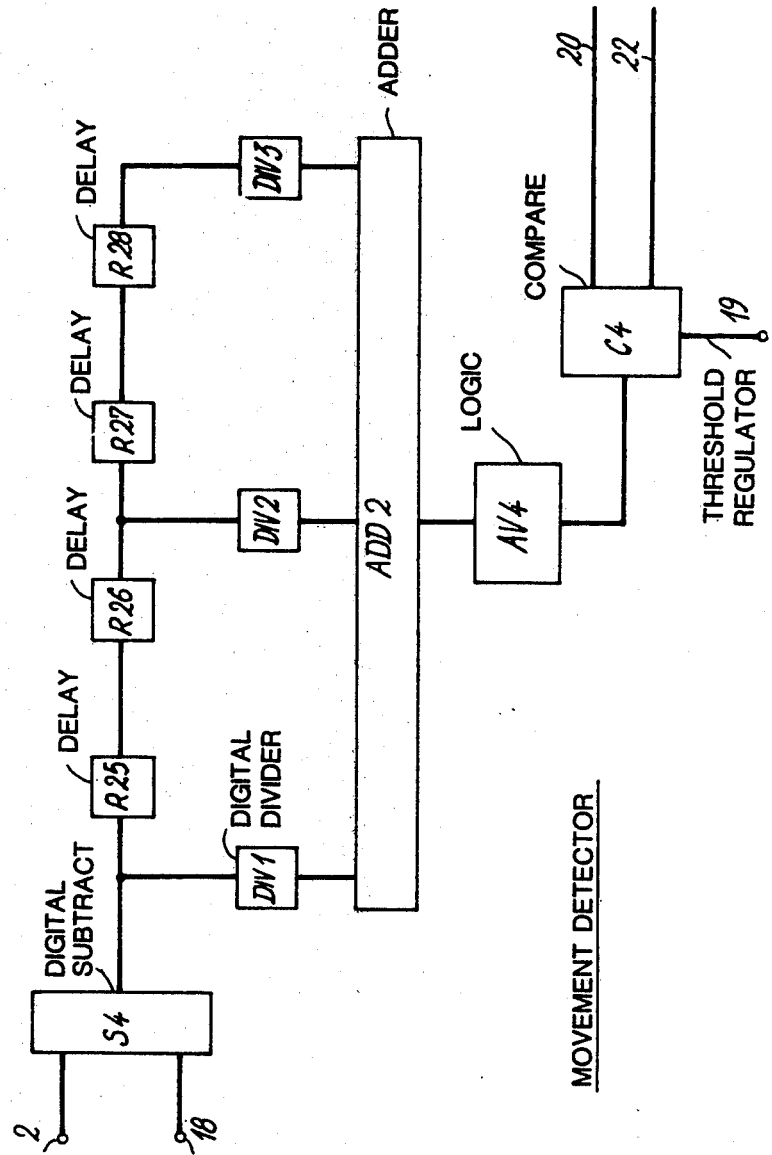
FIG. 5 is the diagram of a second movement detector for use in the system in FIG. 1.

FIG. 5 shows another example of the circuit 17 in FIG. 1. The circuit in FIG. 5 incorporates an input connected to the output of converter 2, which supplies the first input of a digital subtraction circuit S4 and an input connected to the output of memory 18 which supplies the second input of circuit S4. The output of S4 is connected to a delay circuit containing four delay lines R25 to R28 assembled consecutively. The output of subtractor S4 is, in turn, connected to the first input of a digital adder circuit ADD2 via a digital divider DIV1. The point common to delay lines R26 and R27, is connected via a digital divider DIV2, to the second input of the adder circuit ADD2. The output of delay R28 is connected to the third input of the circuit ADD2 via a digital divider DIV3. The delay lines R25 to R28 are identical to delay line R1.

The output of circuit ADD2 is connected to the input of a standard logic circuit AV4, which only retains the absolute value of the algebraic calculation issued by ADD2. The output of the circuit AV4 is connected to an input of a logical comparison circuit C4, whose second input is connected to the threshold value input 19, and which activates either line 20 or 22 depending on whether the output value of AV4 is greater or less than the threshold value.

It should be noted that the division relationships between the circuits DIV1, DIV2 and DIV3 should preferably be $\frac{1}{4}$, $\frac{1}{2}$ and $\frac{1}{4}$ respectively. It appears that the values applied to the inputs of ADD2 correspond, given the above weighting, to the values of the points flanking the point E8 on the same line, but displaced by two steps. It is evident that one could provide for more than three inputs for the circuit ADD2 and affect the points immediately adjacent to E8 on the same line by changing the weighting coefficients. This can be achieved by connecting the points common to delay lines R25 and R26, and delay lines R27 and R28 by dividers at the additional inputs of ADD2.

It should also be noted that the input of threshold value 19 is able to provide two comparison threshold values which enables three output lines, 20, 21, and 22, at the output of C4 to be used. It is also possible to provide for comparator C4 a complex circuit containing, for example, the series of circuits L1, R23, RT3, RT4 and the switch 25 in FIG. 4, to cause spatial or temporal hysteresis.

In the examples described above, it has been assumed that the movement detector output signals can only serve to select the filter circuit output to be used. However one could also provide for a calculation circuit such as calculators 10 or 11, whose weighting coefficients of the addition to be carried out could be controlled by the movement detector output signals. The series of filter circuits could therefore be reduced to a single filter circuit, whose adding circuit would have weighting coefficients dependent on the decision information provided by the movement detector.

It is also evident from the above that the process performed in the process detector requires a certain length of time. For instance in the circuit in FIG. 5, the second point following the point E8 on the same line must be available before the comparator C4 is able to make a decision. To compensate for this delay, a delay line 27 between the output of the convertor 2 and the processor circuit 4 is provided for, which compensates for the delay in the movement detector 5.

The system according to the invention may be applied to colour picture processing either by applying colour filters to the brightness only or to the picture components, on condition that the composite signal has been processed beforehand so that it recurs from one picture to the next.

Although the principles of the present invention have been described above in relation to particular usages, it must be understood that the description has only been given as an example and does not limit the scope of the invention.

We claim:

1. A system for improving the signal-to-noise ratio in an incoming video signal, said system comprising first and second storage means for separately storing video signals for comparison with a later received incoming video signal, transmitting means for directly transmitting incoming video signals as they are received; first means jointly responsive to said video signals stored in said first storage means and to said later received incoming video signals for respectively developing output video signals, movement detector means including processing means responsive to said incoming video signal and to previous incoming video signals stored in said second storage means for developing multi-condition control signals and for utilizing internally developed difference signals for indicating the differences between a current incoming video signal point and its neighboring video signal points and the corresponding points of video signals stored in said second storage means, gating means responsive to said multi-condition control signals for selectively connecting either said incoming signal from said transmitting means or said output video signals from said first means to an output terminal and also to said first storage means, means included in said movement detector responsive to said difference signals relative to a predetermined threshold level for delivering binary signals to indicate whether said difference is above or below said threshold level, and logic circuit means also included in said movement detector means responsive to said binary signals and to at least one of said multi-condition control signals for providing said multi-condition control signals to said gating means.

2. The system as in claim 1 wherein the first means comprises two-input adder means, the weighting coefficients of values applied to both inputs of the adder means being equal to $\frac{1}{2}$.

3. The system as in claim 1 wherein the weighting coefficients of the values applied respectively to the first and second inputs of the first means are equal respectively to $\frac{1}{4}$ and $\frac{3}{4}$.

4. The system of claim 1 and means for feeding back said multi-condition control signals to said logic circuit means according to the following truth table:

| | x | | |
|---|---|---|---|
| y | x < M | M < x < N | x > N |
| y = 0 | 22 | 21 | 20 |
| y = 1 | 21 | 20 | 20 | where:
  20, 21, 22 represent three separate gating control signals;
  x represents the number of points exceeding the threshold level;
  y represents decisions for preceding points; and
  M and N are threshold values.

5. The system of claim 4 characterized in that said first means includes a plurality of filter circuits and said movement detector means includes at least one two-input evaluation circuit means having a first input connected to the input of the detector means and a second input connected to the output of said second storage means, the input of said second storage means being connected to the input of the detector means, said evaluation circuit means incorporating means for providing a series of digital signals representing differences between the respective digital values of a first series of video signal points including the current points being processed and points adjacent the current point and corresponding points of the preceding picture taken from said second storage means; means for comparing the individual difference signals to a first digital threshold value; means responsive to said comparing means for providing said command signal for selecting the outputs of said transmitting means and said filter circuits in accordance with the results of the comparison.

* * * * *